(12) United States Patent
Hofmockel

(10) Patent No.: US 7,753,683 B2
(45) Date of Patent: Jul. 13, 2010

(54) HEADREST SYSTEM FOR A VEHICLE SEAT

(75) Inventor: Jürgen Hofmockel, Ansbach (DE)

(73) Assignee: Alfmeier Prazision AG Baungruppen und Sysemlosungen, Treuchtlingen (DE)

( * ) Notice: Subject to any disclaimer, the term of this patent is extended or adjusted under 35 U.S.C. 154(b) by 122 days.

(21) Appl. No.: 11/957,574

(22) Filed: Dec. 17, 2007

(65) Prior Publication Data

US 2009/0246978 A1 Oct. 1, 2009

(30) Foreign Application Priority Data

Jan. 31, 2007 (DE) .................. 10 2007 005 737

(51) Int. Cl.
*H01R 39/00* (2006.01)
(52) U.S. Cl. ........................... 439/23; 439/668
(58) Field of Classification Search ............. 439/20–26, 439/374, 582, 668; 297/410, 403, 391, 408
See application file for complete search history.

(56) References Cited

U.S. PATENT DOCUMENTS

| | | | |
|---|---|---|---|
| 3,186,763 A | 6/1965 | Ferrara | |
| 3,229,240 A | * 1/1966 | Harrison, Sr. et al. | ....... 439/692 |
| 3,603,642 A | 9/1971 | Laessker | |
| 4,111,483 A | 9/1978 | Jaeger | |
| 4,111,484 A | 9/1978 | Jaeger | |
| 4,128,274 A | 12/1978 | Schmedemann | |
| 4,545,618 A | 10/1985 | Kitamura | |
| 4,600,240 A | 7/1986 | Suman et al. | |
| 4,639,041 A | 1/1987 | Furukawa | |
| 4,678,232 A | 7/1987 | Ishida et al. | |
| 5,108,150 A | 4/1992 | Stas et al. | |
| 5,110,185 A | 5/1992 | Schmutz et al. | |
| 5,397,170 A | 3/1995 | Shrock | |
| 5,474,358 A | 12/1995 | Maeyaert | |
| 5,484,189 A | 1/1996 | Patterson | |
| 5,590,933 A | 1/1997 | Andersson | |

(Continued)

FOREIGN PATENT DOCUMENTS

DE 3545142 6/1987

(Continued)

OTHER PUBLICATIONS

Abstract of DE 3545142, published Jun. 25, 1987.

(Continued)

*Primary Examiner*—Phuong K Dinh
(74) *Attorney, Agent, or Firm*—Dority & Manning, P.A.

(57) ABSTRACT

The invention relates to a headrest system for a vehicle seat. The headrest system includes a headrest supported by at least one holding rod, a guide component which can be secured in a backrest of the vehicle seat and is configured to accommodate the holding rod, a first electric connector disposed on a free end of the holding rod, and a second electric connector which cooperates with the first electric connector and can be secured in the backrest. The joining direction of the first and second electric connectors runs approximately coaxially to a central longitudinal axis of the free end of the holding rod. Each of the first and second electric connectors includes at least two contact elements, each of the contact elements designed in a rotationally symmetrical manner in relation to the central longitudinal axis.

18 Claims, 5 Drawing Sheets

U.S. PATENT DOCUMENTS

| | | |
|---|---|---|
| 5,651,584 A | 7/1997 | Chenot et al. |
| 5,775,777 A | 7/1998 | Delling |
| 5,860,703 A | 1/1999 | Courtois et al. |
| 6,022,078 A | 2/2000 | Chang |
| 6,074,011 A | 6/2000 | Ptak et al. |
| 6,152,531 A | 11/2000 | Deceuninck |
| 6,361,113 B2 * | 3/2002 | Heilig .................. 297/410 |
| 6,508,512 B2 | 1/2003 | Saberan et al. |
| 6,612,653 B2 | 9/2003 | Takata |
| 6,619,739 B2 | 9/2003 | McMillen |
| 6,666,516 B2 | 12/2003 | Grammss et al. |
| 6,736,461 B2 | 5/2004 | Blair et al. |
| 6,796,613 B2 | 9/2004 | Klink et al. |
| 6,805,411 B2 | 10/2004 | Gramss et al. |
| 6,824,214 B2 | 11/2004 | McMillen |
| 6,942,293 B2 | 9/2005 | Kluehspies |
| 7,165,814 B2 | 1/2007 | Gans et al. |
| 7,284,793 B2 | 10/2007 | Klühspies et al. |
| 2003/0111885 A1 | 6/2003 | McMillen |
| 2003/0151290 A1 | 8/2003 | Gans et al. |
| 2005/0023878 A1 | 2/2005 | Kluehspies |
| 2005/0218708 A1 | 10/2005 | Gramss |
| 2005/0225144 A1 | 10/2005 | Kluhspies et al. |
| 2006/0119163 A1 | 6/2006 | Gans et al. |
| 2006/0163928 A1 | 7/2006 | Droche |
| 2006/0163929 A1 | 7/2006 | Ebbeskotte et al. |

FOREIGN PATENT DOCUMENTS

| | | |
|---|---|---|
| DE | 19532260 | 3/1997 |
| DE | 29809175 | 10/1998 |
| DE | 19853624 | 5/2000 |
| DE | 102004038707 | 4/2005 |
| DE | 102004007325 | 9/2005 |
| EP | 0829390 | 3/1998 |
| EP | 0976608 | 2/2000 |
| EP | 0990555 | 4/2000 |
| EP | 1277612 | 1/2003 |
| EP | 1502809 | 2/2005 |
| EP | 1582400 | 2/2005 |
| EP | 1686004 | 8/2006 |
| EP | 1752334 | 2/2007 |
| JP | 57144135 | 9/1982 |

OTHER PUBLICATIONS

Abstract of DE 19532260, published Mar. 6, 1997.
Abstract of DE 19853624, published May 25, 2000.
Abstract of DE 102004038707, published Apr. 28, 2005.
Abstract of DE 102004007325, published Sep. 1, 2005.
Abstract of EP 1277612, published Jan. 22, 2003.
Abstract of JP 57144135, published Feb. 14, 2007.

* cited by examiner

HEADREST SYSTEM FOR A VEHICLE SEAT

TECHNICAL FIELD

The disclosure relates to a headrest system for a vehicle seat, into which headrest system there is integrated an electrical device, for example, a motor used for pivoting the headrest. An electrical connection to the vehicle electrical system is required for supplying power to the electrical device. For this purpose, a cable section is laid in the backrest of the seat. The headrest can be coupled to the cable section with the help of a connector disposed on the free end of a holding rod and a connector disposed in the backrest. Each of the connectors includes at least two contact elements.

BACKGROUND

In systems that are disclosed, for example, in DE 10 2005 014 897, EP 0 858 929 A1, and DE 10 2004 007 325 B3, it must be ensured that the two connectors are disposed in a predefined rotational position with respect to their joining direction, the direction in which the connectors have to be moved relatively toward each other to join them together, or with respect to the central longitudinal axis of the free end of the holding rod that supports one connector. The connectors must therefore be positioned in a predefined rotational position on the holding rod, on a guide component which receives the holding rod and is disposed in the backrest, or on another component. This rotational positioning requirement increases the costs of production and assembly and involves the risk of a defective assembly.

SUMMARY

It is the object of the invention to suggest a headrest system which provides a simplified production and assembly process and eliminates the risk of a defective connector assembly, as discussed above.

This object and others may be achieved in a headrest system wherein the contact elements of the connectors are annular with regard to the joining direction and/or the central longitudinal axis of the holding rod. In the case of a connector designed as a plug, this is possible with low production and assembly costs through the use of a connector which includes a central contact pin and a contact sleeve. The contact pin may extend in the joining direction and penetrate the contact sleeve. The contact sleeve may have an electrical insulation on its inner side. The contact pin may form a first contact element, and the contact sleeve may form a second contact element. The contact sleeve can be held on the contact pin, for example, by friction. An electrical insulation between the contact pin and the contact sleeve can be easily implemented in the form of a sleeve, which is made of an electrically insulating material such as, for example, plastic, and which is fitted on or penetrated by the contact pin.

In the case of a connector designed as a socket, the connector may include a recess. The recess receives the contact pin. In the recess are disposed two contact sleeves. The contact sleeves are spaced apart in the joining direction, are electrically insulated from each other, and cooperate with the contact pin or the contact sleeve of the plug. Such a connector can likewise be produced with less expenditure. For example, the contact sleeves and, optionally, the connecting cables connected thereto can be held by or embedded in an injection-molded plastic part.

A connector that is arrested on a holding rod, be it designed as a plug or a socket, is preferably disposed in a hollow space existing in the free end of the holding rod. This ensures both that the connector is easily secured and that the connector is provided with mechanical protection. The connector can be secured in the hollow space with particular ease if a longitudinally-extending section of the connector is provided with a design resembling a ribbed plug. If such a connector is inserted into the holding rod, the ribs anchored against the inner wall of the holding rod securely hold the connector in the holding rod.

The connector present in the backrest is disposed such that it is either stationary or height variable, such as in the case of a height-adjustable headrest. In the former case, the connector is expediently arrested on a guide component by means of a snap-fit joint in such a way that when the holding rod is completely inserted into the guide component, the connector on the holding rod is properly connected to the stationary connector of the backrest. For example, due to manufacturing tolerances and inaccuracies in assembly there exists the risk that when the holding rod is inserted into the guide component, thereby joining the connectors, an undesirable force is applied to the connector present in the backrest. This involves the risk of the snap-fit joint between the guide component and the connector getting damaged or loose. In a preferred embodiment, this is prevented by securing the connector on the end of the guide component that is positioned away from the headrest by means of a snap-fit joint. The joining direction of the snap-fit joint runs transversely to the central longitudinal axis of the holding rod or the joining direction of the connectors. Additionally, damage or loosening is prevented by means of an undercut, which is effective in the direction of the central longitudinal axis. A force acting on the connector thus stresses the structures forming the undercut, and not the snap-fit elements. The undercut structures can be provided with a substantially more stable and stress-resistant design than the snap-fit elements since, unlike a snap-fit joint, they are not required to be flexibly deformable. In the present case, snap-fit joints are solely used to laterally position the connector on the guide component or on another component of the backrest.

The undercut is preferably formed by an undercut element, which is present on that side of the connector that faces the guide component and which extends transversely to the joining direction of the connectors. This undercut element cooperates with a counter element, which is located on the guide component and is provided with a complementary design. Due to this design, the connector can be made to slide on the guide component laterally during assembly. This enables the snap-fit joint and the undercut to be produced simultaneously. The undercut element and the counter element preferably cooperate in such a way that the connector can be positioned in any rotational position on the guide component depending on the installation circumstances. In an advantageous embodiment, the undercut element is a circular ring-shaped flange, which projects from the peripheral surface of the guide component in the radial direction, and the counter element is a groove, which is located on the connector and receives the flange.

BRIEF DESCRIPTION OF THE DRAWINGS

Additional preferred embodiments are explained in the following description based on the enclosed figures, in which.

DETAILED DESCRIPTION OF THE DRAWINGS

Figure 1:
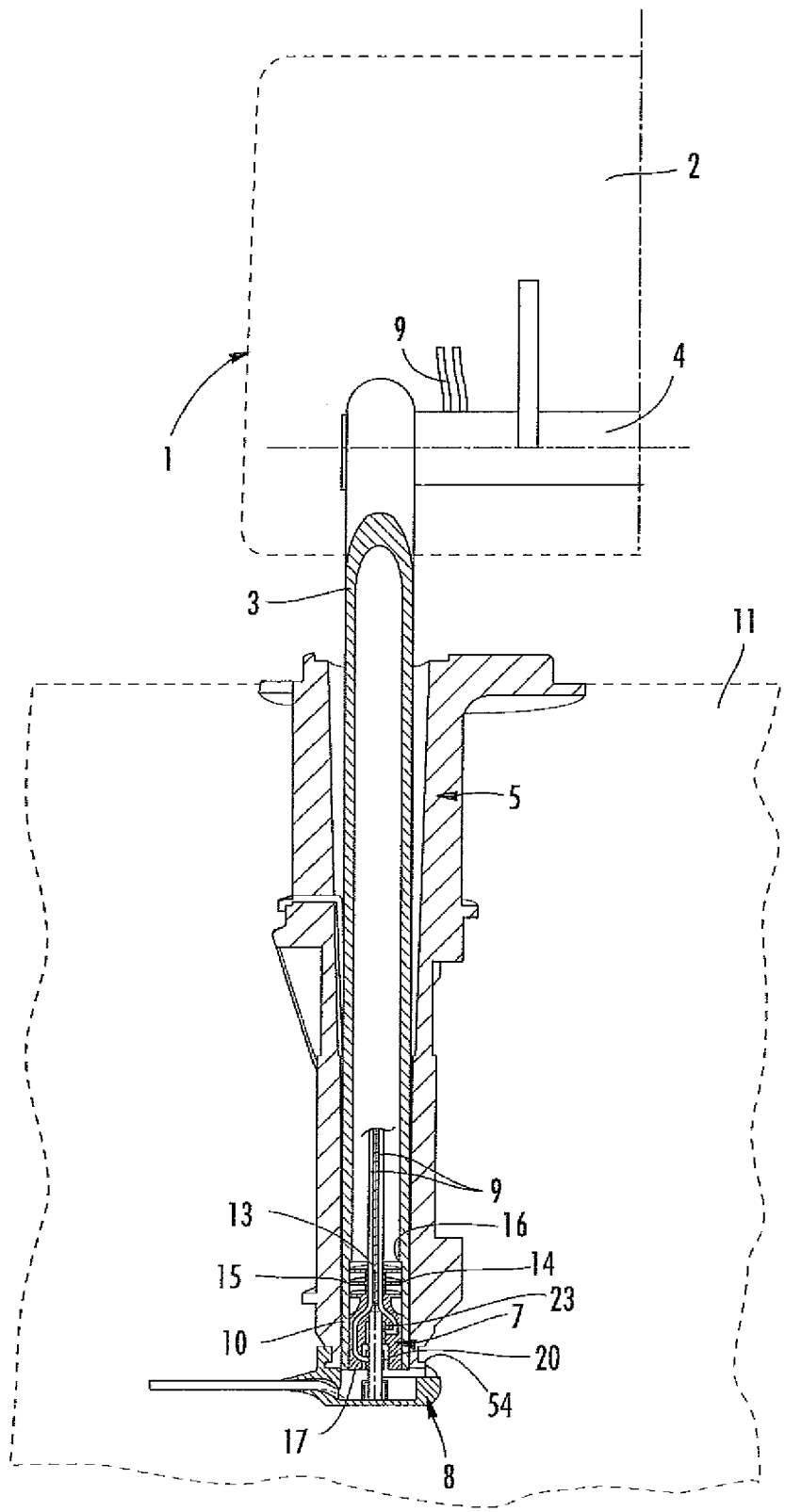
FIG. 1 is a partial sectional view of a headrest system comprising a headrest supported by two holding rods, a backrest with a guide component disposed therein, and two connectors, namely a socket and a plug.

Detailed reference will now be made to the drawings in which examples embodying the present invention are shown. The detailed description uses numerical and letter designations to refer to features in the drawings. Like or similar designations in the drawings and description have been used to refer to like or similar parts of the invention.

The drawings and detailed description provide a full and detailed written description of the invention, and the manner and process of making and using it, so as to enable one skilled in the art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 4:
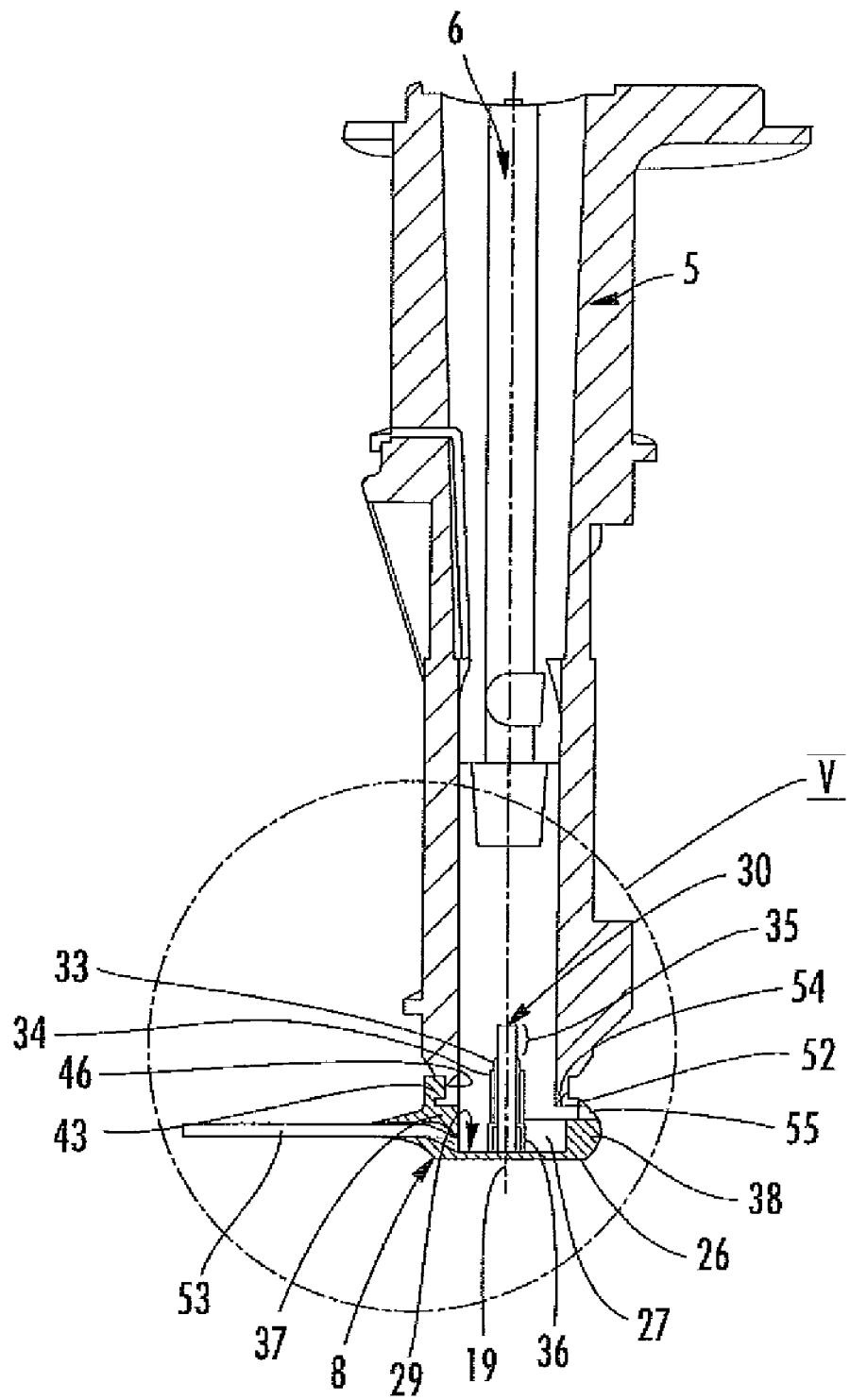
FIG. 4 shows a longitudinal sectional view of a guide component, with the plug of FIG. 3 secured on the end of the guide component that is positioned away from the headrest.

The headrest system shown in FIG. 1 in its installed state is substantially composed of a headrest 1 and a backrest 11. The headrest 1 may include an impact body 2, and two holding rods 3 (only one of which is shown in FIG. 1) which are interconnected by means of a transverse bar 4 disposed inside the impact body 2. A substantially tubular guide component 5 is disposed in the backrest 11 of a vehicle seat. The guide component 5 defines a channel 6 (see FIG. 4) for receiving the holding rod 3 and two connectors, namely a socket 7 that is connected to the holding rod 3 and a plug 8 that is secured on the end of the guide component that is positioned away from the headrest 1. An electrical device (not shown) is present in the headrest 1. For connecting to a vehicle electrical system, two (or more) electrical cables 9 are led via the internally hollow transverse bar 4 and the likewise internally hollow holding rod 3 to the free end 10 of the holding rod 3 or to the socket 7 disposed in the free end 10 of the holding rod 3.

Figure 2:
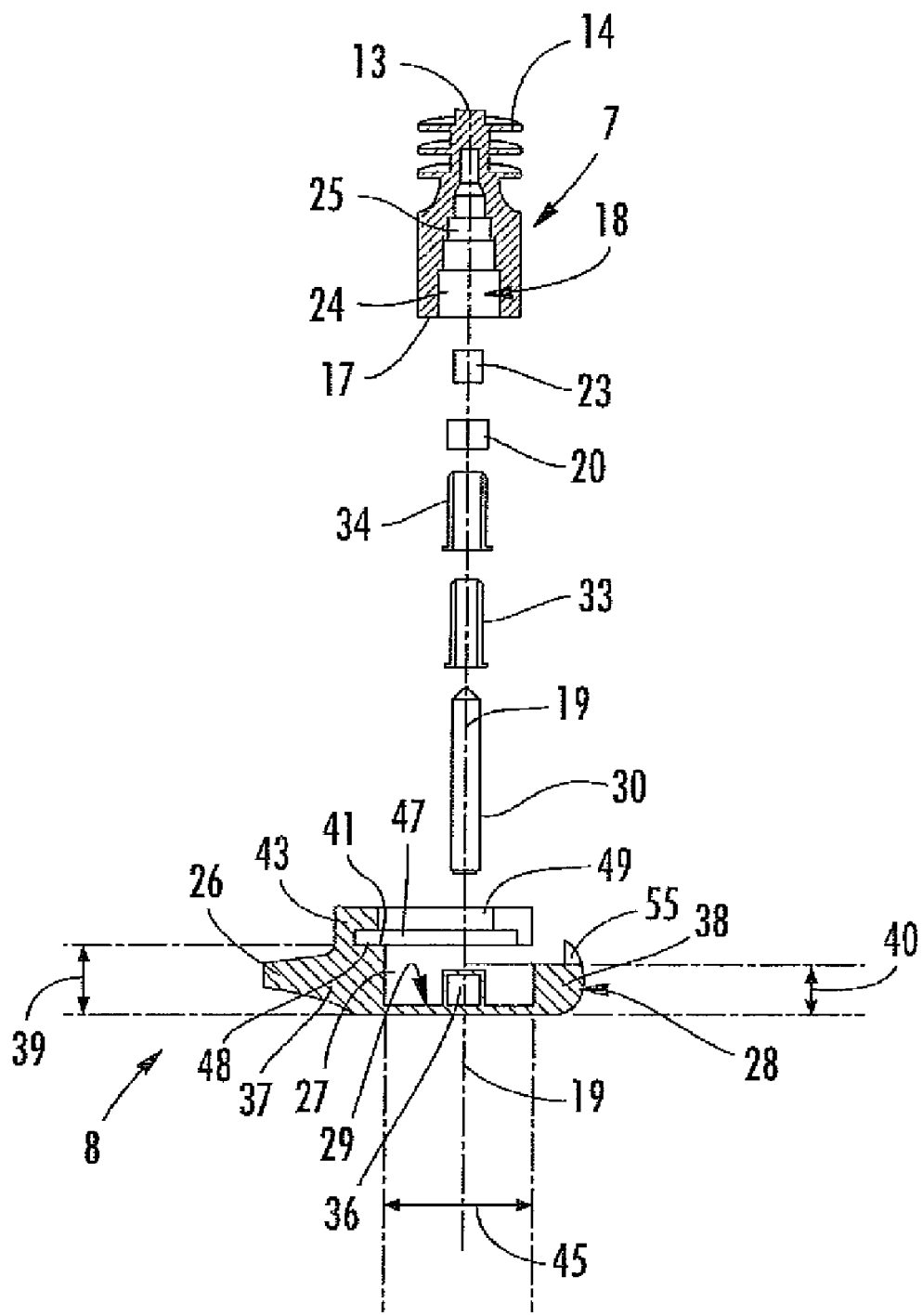
FIG. 2 is a sectional exploded view of the connectors shown in FIG. 1, the contact elements of the connectors being shown in the disassembled state.

The socket 7 comprises a substantially rotationally symmetrical plastic body, the outer diameter of which corresponds approximately to the inner diameter of the free end 10 of the holding rod 3. Several ribs 14 are formed on the longitudinal section 13 of the socket 7 that faces the headrest 1 and has a reduced diameter. These ribs 14 extend radially and are anchored against the inner wall of the free end 10. In this way, the socket 8 is held in the holding rod 3. The diameter of the region 15 of the holding rod 3 that receives the socket 7 is larger than the diameter of the remaining part of the interior of the holding rod 3. The region 15 merges into the remaining part of the interior of the holding rod 3 at a radial shoulder 16. The radial shoulder 16 serves as an insertion limit stop for the socket 7. A central recess 18 (see FIG. 2), which opens into the front side 17 of the socket 7, is present in the socket 7. The recess 18 comprises two contact elements, namely a first contact sleeve 20 and a second contact sleeve 23 (see FIGS. 1, 2, and 5; not shown in FIG. 4 for the sake of clarity). The contact sleeves 20 and 23 are designed in a rotationally symmetrical manner with respect to the central longitudinal axis 19 of the free end 10 of the holding rod 3 or the joining direction 42 of the socket 7 and the plug 8 (see FIG. 5). The diameter of the first contact sleeve 20 is larger than that of the second contact sleeve 23. The contact sleeves 20 and 23 are disposed in the longitudinal sections 24 and 25 respectively, which are located in the recess 18 and have corresponding diameters. For example, the first contact sleeve 20 is disposed in the longitudinal section 24 and the second contact sleeve 23 is disposed in the longitudinal section 25. Those ends of the cable 9 that lead to the contact sleeves 20, 23 are embedded in the plastic body of the socket 7.

Figure 3:
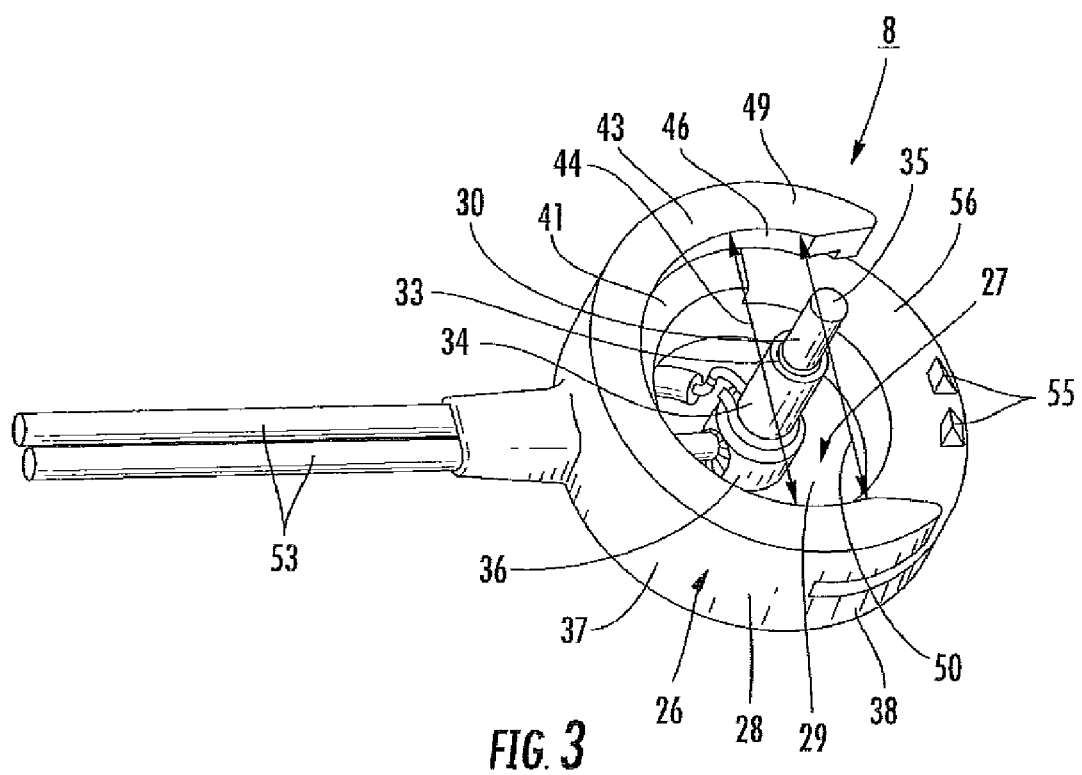
FIG. 3 is a perspective view of a connector designed as a plug.

A connector designed as a plug 8 comprises a housing 26 which is made of, for example, plastic. The housing 26 has a substantially cup-shaped design and, accordingly, a central recess 27, which is defined by an annular wall 28. A contact pin 30, on which an insulating sleeve 33 is fitted, projects centrally from the base 29 of the recess. A contact sleeve 34 is in turn fitted on the insulating sleeve 33 (see FIGS. 2, 3, and 4; not shown in FIGS. 1 and 5 for the sake of clarity). The sleeves 33 and 34 are shorter than the contact pin 30, so that the contact pin 30 projects from the sleeves with a projecting end 35. In the assembled state (see FIGS. 1 and 5), the projecting end 35 of the contact pin 30 penetrates the second contact sleeve 23 of the socket 7 and the contact sleeve 34 penetrates the first contact sleeve 20 of the socket 7. For securing the contact pin 30 in the housing 26, a cylindrical sleeve 36 projects from the base 29 of the recess 27. The cylindrical sleeve 36 receives that end of the contact pin 30 that is positioned away from the socket 7. Cables 53 are connected to the contact pin 30 and the contact sleeve 34 of the plug 8. These cables 53 lead laterally from the housing 26 so that the housing 26 has a small overall height.

The annular wall 28 is divided into two wall sections 37 and 38, each of which runs over an arc segment of 180°. The height 39 of the wall section 37 is greater than the height 40 of the wall section 38 (see FIG. 2). A projection 43 designed as a circumferentially open ring is formed on the upper side 41 of the wall section 37 that is positioned toward the socket 7. The inner diameter 44 of the projection 43 is larger than the inner diameter 45 of the recess 27 of the housing 26. A groove 47 is inserted in the inner wall 46 of the projection 43. The side wall 48 of the groove 47 that is positioned facing the socket 7 is flush with the upper side 41 of the wall section 37. The free ends 49 of the projection 43 extend beyond the wall section 37. The least inside width 50 between the free ends is smaller than the inner diameter 44 of the projection 43.

A flange 54 is formed on that lower front side of the guide components that is positioned away from the headrest 1. The flange 54 projects radially outward and is inserted in the groove 47 of the projection 43 in the assembled state. This forms an undercut between the plug 8 and the guide component 5, which undercut is effective in the direction of the central longitudinal axis 19 or the joining direction 42. The plug 8 is held laterally on the guide component 5 by means of a snap-fit joint, the joining direction 51 of which runs transversely to the central longitudinal axis 19. For this purpose, two detent projections 55 project from the upper side 56 of the wall section 38. These detent projections 55 engage behind the peripheral surface 52 of the flange 54 in the assembled state and form an undercut between the guide component 5 and the plug 8, which undercut is effective transversely to the central longitudinal axis 19 or transversely to the joining direction 42. The detent projections 55 need not be provided with an extremely stable design since the plug 8 is stressed at best only to a small extent in the direction running transversely to the central longitudinal axis 19. Furthermore, the lateral fixation of the plug 8 is enhanced by the fact that the free ends 49 of the projection 43 resiliently engage behind the periphery of the guide component 5.

Figure 5:
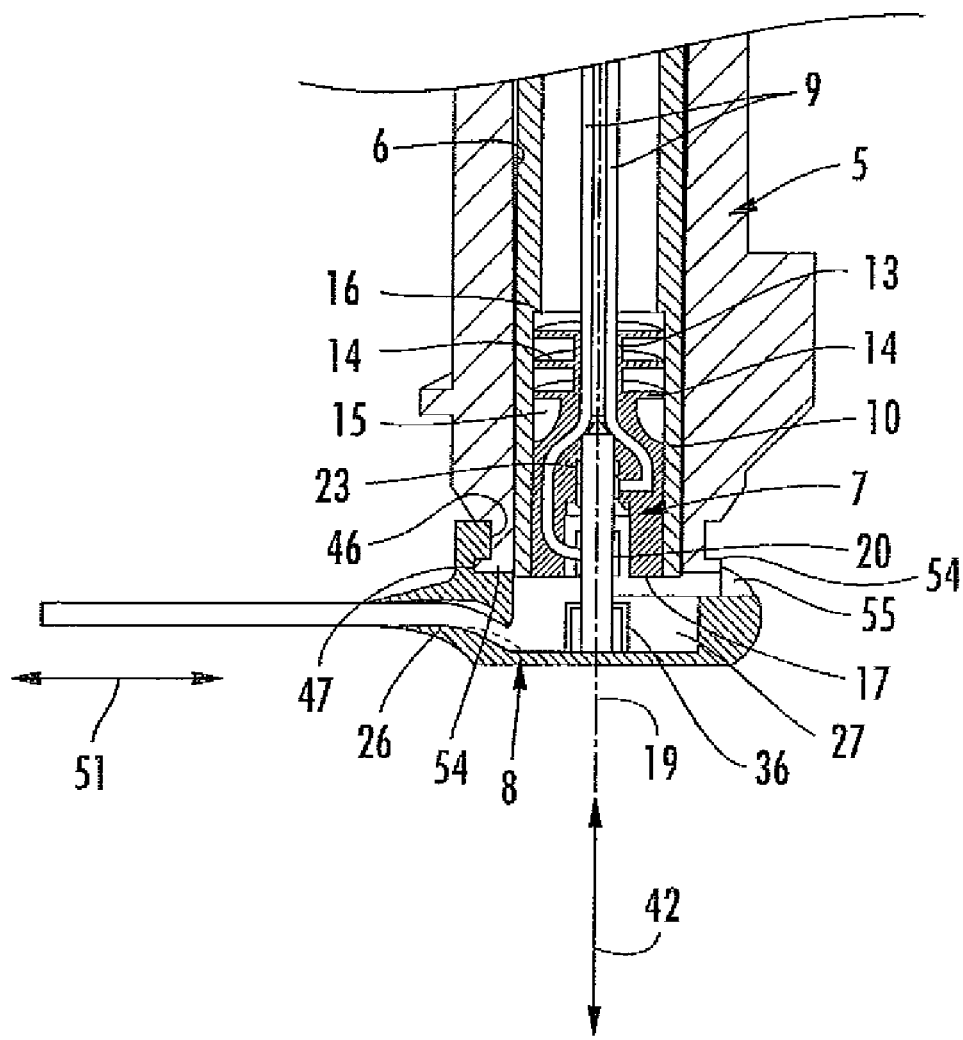
FIG. 5 shows section V of FIG. 4.

Use of the undercut overcomes alignment issues that might occur if force is applied in the direction of the central longitudinal axis 19, such as when inserting the holding rod 3 into the channel 6 of the guide component 5, where a downwardly acting force might be exerted on the contact pin 30. This is because, for example, the socket 7 or its contact sleeves 20 and 23 might not be aligned exactly coaxially due to manufacturing tolerances 8. However, the undercut formed by the groove 47 and the flange 54 securely intercepts this force. In order to prevent the plug 8 from being impinged upon by the free end 10 of the holding rod 3 in the case of a larger insertion depth of the holding rod 3 than what is shown in FIG. 5, the diameter 45 of the recess 27 of the plug 8 is dimensioned in such a way that it is slightly larger than the diameter of the free end 10 of the holding rod 3.

While preferred embodiments have been shown and described, those skilled in the art will recognize that changes and modifications may be made to the foregoing examples without departing from the scope and spirit of the invention. For example, specific styles and dimensions of various elements of the illustrated embodiments and materials used for those elements may be altered to suit particular applications and industry regulations. It is thus intended to claim all such changes and modifications as fall within the scope of the appended claims and their equivalents.

The invention claimed is:

1. Headrest system for a vehicle seat, said headrest system comprising:
   a headrest supported by at least one holding rod,
   a guide component which can be secured in a backrest of the vehicle seat and is configured to accommodate the holding rod,
   a first electric connector disposed on a free end of the holding rod, and a second electric connector which cooperates with the first electric connector and can be secured in the backrest,
   the joining direction of the first and second electric connectors running approximately coaxially to a central longitudinal axis of the free end of the holding rod, and each of the first and second electric connectors including at least two contact elements, each of the contact elements being disposed coaxially with the central longitudinal axis and configured to provide electrical contact in case of relative rotation of the first electric connector or the second electric connector about the central longitudinal axis.

2. Headrest system according to claim 1, wherein the second electric connector is designed as a plug and includes a central contact pin, which extends along the central longitudinal axis and penetrates a contact sleeve, the contact sleeve having an electrical insulation on its inner side.

3. Headrest system according to claim 2, wherein the electrical insulation is designed as a separate insulating sleeve which is penetrated by the contact pin.

4. Headrest according to claim 2, wherein the first electric other connector is designed as a socket and defines a recess which receives the contact pin and in which are disposed a first and second contact sleeves, the first and second contact sleeves extending coaxially to the central longitudinal axis and electrically insulated from each other, the first contact sleeve cooperating with the contact sleeve of the plug and the second contact sleeve cooperating with the contact pin of the plug.

5. Headrest system according to claim 1, wherein the first electric connector is disposed in a hollow space existing in the free end of the holding rod.

6. Headrest system according to claim 1, wherein a longitudinal section of the first connector is provided with a plurality of radially extending ribs.

7. Headrest system according to claim 1, wherein the second electric connector is secured on an end of the guide component that is positioned turned away from the headrest by a snap-fit and an undercut element, and wherein a joining direction of the snap-fit element runs transversely to the central longitudinal axis, and wherein the undercut element is effective in the direction of the central longitudinal axis.

8. Headrest system according to claim 7, wherein the undercut element extends transversely to the central longitudinal axis and is disposed on the guide component, and wherein the undercut element cooperates with a counter element disposed on the connector.

9. Headrest system according to claim 8, wherein the undercut element and the counter element cooperate in such a way that the connector can be secured on the guide component in any rotational position with respect to the control longitudinal axis.

10. Headrest system according to claim 9, wherein the undercut element is an annular ring-shaped flange which projects from a peripheral surface of the guide component in the radial direction, and wherein the counter element is a groove on the connector which is configured to receive the flange.

11. Headrest system according to claim 7, wherein the snap-fit element is disposed on the side of the connector that faces the guide component, and wherein the which snap-fit element is configured to engages that an outer surface of the guide component that runs transversely to the joining direction of the snap-fit joint.

12. Headrest system according to claim 7, wherein a cable extends laterally through the housing of the second electric connector.

13. An assembly for electronically connecting a headrest with a backrest, the assembly comprising:
   at least one holding rod connected to the headrest;
   a guide component situated within the backrest;
   a first electric connector disposed on the holding rod; and
   a second electric connector disposed within the backrest, the first and second electric connectors being configured to be joined in a direction coaxial to the central longitudinal axis of the holding rod, and wherein the first and second electric connectors each include a plurality of contact elements, the contact elements of each of the first and second electric connectors being spaced from each other, each of the contact elements being disposed coaxially with the central longitudinal axis of the holding rod and configured to provide electrical contact in case of relative rotation of the first electric connector or the second electric connector about the central longitudinal axis of the holding rod.

14. The headrest system of claim 13, wherein the second electric connector is a plug, and wherein the plurality of annular contact elements of the second electric connector include a central contact pin and a plug contact sleeve, the central contact pin extending along the longitudinal axis of the holding rod.

15. The headrest system of claim 14, further comprising an insulating sleeve disposed inside the plug contact sleeve, the insulating sleeve separate from the plug contact sleeve and surrounding the contact pin.

16. The headrest system of claim 14, wherein the first electric connector is a socket, and wherein the plurality of annular contact elements of the first electric connector include a first contact sleeve and a second contact sleeve, the first and second contact sleeves extending along the longitudinal axis of the holding rod.

17. The headrest system of claim 16, wherein the first contact sleeve is electrically insulated from the second contact sleeve.

18. The headrest system of claim 16, wherein the first contact sleeve is configured to cooperate with the plug contact sleeve, and wherein the second contact sleeve is configured to cooperate with the contact pin.

* * * * *

UNITED STATES PATENT AND TRADEMARK OFFICE
CERTIFICATE OF CORRECTION

PATENT NO. : 7,753,683 B2  Page 1 of 1
APPLICATION NO. : 11/957574
DATED : July 13, 2010
INVENTOR(S) : Jürgen Hofmockel It is certified that error appears in the above-identified patent and that said Letters Patent is hereby corrected as shown below:

Item (73) Assignee, please delete the word "Baungruppen" and insert --Baugruppen--

Item (73) Assignee, please delete the word "Sysemlosungen" and insert --Systemlosungen--

Column 6, line 29, please delete the word "which"

Column 6, line 30, please delete the words "engages that" and insert the word --engage--

Signed and Sealed this

Thirtieth Day of November, 2010

David J. Kappos
*Director of the United States Patent and Trademark Office*